United States Patent Office 3,021,371
Patented Feb. 13, 1962

3,021,371
1,3-BIS(1'-ETHYNYL-1'-CYCLOHEXYLOXY)-
2-PROPANOL
Edward J. Watson, Jr., Norwich, N.Y., assignor to The Dow Chemical Company, Midland, Mich., a corporation of Delaware
No Drawing. Filed Mar. 20, 1961, Ser. No. 96,723
1 Claim. (Cl. 260—611)

The present invention is directed to 1,3-bis(1'-ethynyl-1'-cyclohexyloxy)-2-propanol corresponding with the formula

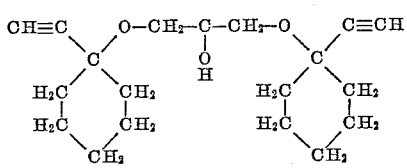

This compound is a liquid material which is somewhat soluble in many common organic solvents and of low solubility in water. The compound is useful as a parasiticide and herbicide and is adapted to be employed for the control and the killing of many parasite, bacterial and plant species such as pigweed, wild oats, crab grass and nematodes.

The new compound may be prepared by reacting 1-ethynyl-1-cyclohexanol with 1,2-epoxy-3-(1'-ethynyl-1'-cyclohexyloxy)-propane corresponding to the formula

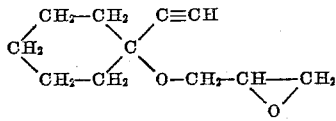

The reaction is carried out in the presence of a catalyst such as stannic chloride, aluminum chloride and zinc chloride, and conveniently in a liquid reaction medium such as benzene, tetrahydrofuran and cyclohexane. The amounts of the reagents to be employed are not critical, some of the desired product being obtained when employing any proportion of the reagents and a catalytic amount of the catalyst. The reaction is somewhat exothermic and takes place readily at temperatures of from 40° to 100° C. with the addition of the reagents. The temperature may be controlled by regulating the rate of contacting the reactants and by external cooling. In carrying out the reaction, the 1-ethynyl-1-cyclohexanol and 1,2 - epoxy-3-(1'-ethynyl-1'-cyclohexyloxy)-propane are contacted and mixed together in any convenient manner and in the presence of a small amount of the catalyst. The reaction mixture is then maintained for a short period of time at the contacting temperature range to insure completion of the reaction. Following the reaction, the reaction mixture may be washed with water and the washed mixture fractionally distilled under reduced pressure to obtain the desired product as a liquid material.

In a representative operation, 360 grams (2 moles) of 1,2 - epoxy-3(1'-ethynyl-1'-cyclohexyloxy)-propane was added portionwise with stirring to a mixture of 372 grams (3 moles) of 1-ethynyl-1-cyclohexanol and 5 milliliters of stannic chloride (SnCl$_4$). The addition was carried out over a period of 30 minutes and at a temperature of from 25° to 55° C. Stirring was thereafter continued for 2 hours and the reaction mixture maintained at a temperature of from 50°–55° C. to complete the reaction. The reaction mixture was then washed with water. During the washing operation, an emulsion formed which was broken by the addition of diethyl ether. The washed product was then fractionally distilled under reduced pressure to obtain a 1,3-bis(1'-ethynyl-1'-cyclohexyloxy)-2-propanol product as a liquid material boiling at 177° C. at 0.6 millimeter pressure and having a refractive index $n/D$ of 1.5070 at 25° C.

The 1.3 - bis(1'-ethynyl-1'-cyclohexyloxy)-2-propanol product of the present invention is useful as a herbicide and parasiticide for the control and the killing of a number of pest species. In such uses, the product is dispersed on a finely divided solid and employed as a dust. Also, such mixtures may be dispersed in water with or without the addition of surface active dispersing agents and the resulting aqueous suspensions employed as sprays. In other procedures, the product is employed as a constituent in solvent solutions, oil-in-water or water-in-oil emulsions or aqueous dispersions. In representative operations, the application of 1,3-bis(1'-ethynyl-1'-cyclohexyloxy)-2-propanol to soil at a dosage of 20 pounds per acre gives 100 percent kills of the germinant seeds and emerging seedlings of pigweed, German millet and Sudan grass.

The 1,2-epoxy-3-(1'-ethynyl-1'-cyclohexyloxy)-propane employed as a starting material in accordance with the present teaching is prepared by reacting 1-ethynyl-1-cyclohexanol with epichlorohydrin in stannic chloride as catalyst, to produce an intermediate 2-chloro-3-(1'-ethynyl-1'-cyclohexyloxy)-2-propanol. This intermediate is then reacted with aqueous alkali metal hydroxide (sodium hydroxide) to obtain the desired starting product as a liquid material.

I claim:
1,3-bis(1'-ethynyl-1'-cyclohexyloxy)-2-propanol.

No references cited.